United States Patent
Sridhar et al.

(10) Patent No.: US 10,498,868 B2
(45) Date of Patent: Dec. 3, 2019

(54) MULTIPATH TRANSPORT COMMUNICATIONS

(71) Applicants: Alcatel-Lucent USA Inc., Murray Hill, NJ (US); Alcatel-Lucent Canada Inc., Ottawa (CA)

(72) Inventors: Kamakshi Sridhar, Plano, TX (US); Jonathan Segel, Ottawa (CA)

(73) Assignees: Alcatel Lucent, Nozay (FR); Nokia of America Corporation, Murray Hill, NJ (US)

( * ) Notice: Subject to any disclaimer, the term of this patent is extended or adjusted under 35 U.S.C. 154(b) by 5 days.

(21) Appl. No.: 15/432,638

(22) Filed: Feb. 14, 2017

(65) Prior Publication Data

US 2018/0234335 A1   Aug. 16, 2018

(51) Int. Cl.
*H04L 29/06* (2006.01)
*H04L 1/16* (2006.01)
*H04L 12/801* (2013.01)

(52) U.S. Cl.
CPC .......... *H04L 69/163* (2013.01); *H04L 1/1607* (2013.01); *H04L 47/193* (2013.01); *H04L 69/14* (2013.01); *H04L 47/14* (2013.01)

(58) Field of Classification Search
CPC ....... H04L 1/1858; H04L 1/189; H04L 45/24; H04L 69/163
See application file for complete search history.

(56) References Cited

U.S. PATENT DOCUMENTS

2010/0284476 A1* 11/2010 Potkonjak ............. H04L 1/1858
375/260
2012/0320752 A1* 12/2012 Gouache ................. H04L 45/24
370/237

(Continued)

OTHER PUBLICATIONS

Ford, A. et al., "TCP Extensions for Multipath Operations with Multiple Address," Internet Engineering Task Force, RFC 6824, Jan. 2013, pp. 1-64.

(Continued)

*Primary Examiner* — Pao Sinkantarakorn
(74) *Attorney, Agent, or Firm* — Tong, Rea, Bentley & Kim, LLC

(57) ABSTRACT

The present disclosure generally discloses improvements in computer performance for supporting a multipath transport throughput capability that is configured to improve throughout of a multipath transport connection of a multipath transport protocol. The multipath transport throughput capability is configured to improve the throughput of the multipath transport connection by improving delivery of acknowledgment packets acknowledging successful delivery of data packets sent from a data transmitting side to a data receiving side. The multipath transport throughput capability may be configured to improve the delivery of acknowledgment packets from the data receiving side to the data transmitting side by, for a data packet that is successfully received at the data receiving side from the data transmitting side, sending multiple acknowledgment packets from the data receiving side to the data transmitting side where the multiple acknowledgment packets associated with the received data packet may be sent over multiple transport connections of the multipath transport connection.

19 Claims, 6 Drawing Sheets

(56) References Cited

U.S. PATENT DOCUMENTS

| | | | |
|---|---|---|---|
| 2013/0077501 A1 | 3/2013 | Krishnaswamy et al. | |
| 2013/0195106 A1 | 8/2013 | Calmon et al. | |
| 2014/0293891 A1* | 10/2014 | Okuda | H04B 7/15528 370/329 |
| 2014/0362765 A1* | 12/2014 | Biswas | H04L 45/24 370/328 |

OTHER PUBLICATIONS

International Search Report and Written Opinion of corresponding PCT Application PCT/US2018/015676, dated Apr. 24, 2018, 11 pages.

* cited by examiner

US 10,498,868 B2

MULTIPATH TRANSPORT COMMUNICATIONS

TECHNICAL FIELD

The present disclosure relates generally to communication networks and, more particularly but not exclusively, to improvements in computer performance for supporting multipath transport protocols in communication networks.

BACKGROUND

Transport layer protocols, such as the Transmission Control Protocol (TCP), have traditionally enabled a pair of peers to establish a connection and to exchange data via the connection using a single path between the peers. Certain transport layer protocols are being adapted to support use of multiple paths between peers. For example, Multipath TCP (MPTCP), which provides the ability to simultaneously use multiple paths between peers, enables data to be exchanged between the peers using multiple TCP flows that traverse multiple, potentially disjoint, paths.

SUMMARY

The present disclosure generally discloses improvements in computer performance for supporting a multipath transport protocol in a communication network.

In at least some embodiments, an apparatus is provided. The apparatus is configured to support a multipath transport connection including a set of transport connections. The apparatus includes a processor and a memory communicatively connected to the processor. The processor is configured to receive a data packet via a first transport connection of the set of transport connections. The processor is configured to send, via the first transport connection, a first acknowledgment packet acknowledging receipt of the data packet via the first transport connection. The processor is configured to send, via a second transport connection of the set of transport connections, a second acknowledgment packet acknowledging receipt of the data packet via the first transport connection. In at least some embodiments, a non-transitory computer-readable storage medium stores instructions which, when executed by a computer, cause the computer to perform a corresponding method for supporting a multipath transport connection including a set of transport connections. In at least some embodiments, a corresponding method for supporting a multipath transport connection including a set of transport connections is provided.

In at least some embodiments, an apparatus is provided. The apparatus is configured to support a multipath transport connection including a set of transport connections. The apparatus includes a processor and a memory communicatively connected to the processor. The processor is configured to send, toward a device via a first transport connection of the set of transport connections, a data packet. The processor is configured to receive, via a second transport connection of the set of transport connections, an acknowledgment packet acknowledging receipt of the data packet by the device via the first transport connection. In at least some embodiments, a non-transitory computer-readable storage medium stores instructions which, when executed by a computer, cause the computer to perform a corresponding method for supporting a multipath transport connection including a set of transport connections. In at least some embodiments, a corresponding method for supporting a multipath transport connection including a set of transport connections is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
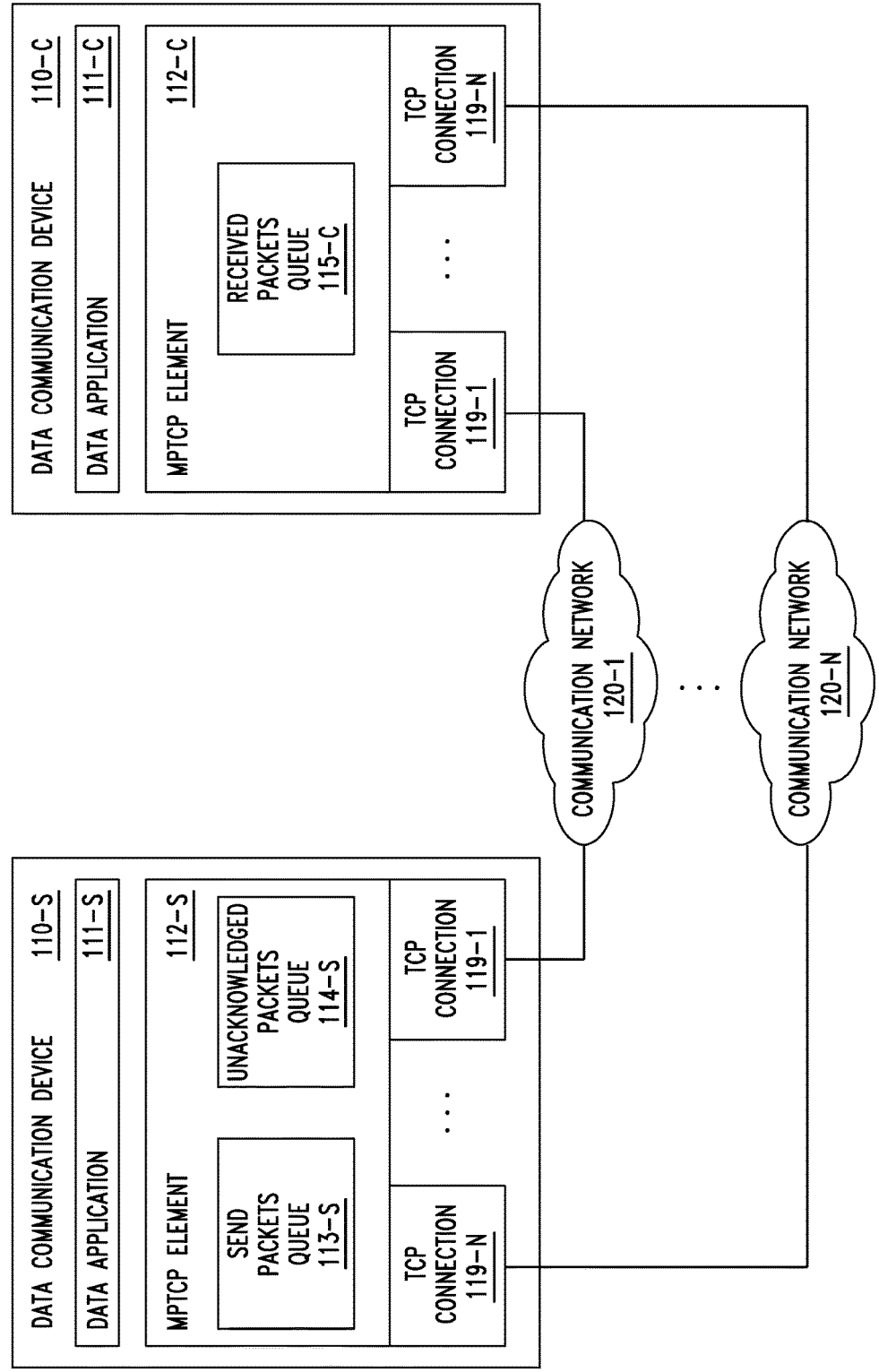
FIG. 1 depicts an example communication network configured to use a multipath transport throughput capability to improve throughout of a multipath connection that is based on a multipath transport protocol.

The present disclosure generally discloses improvements in computer performance for supporting a multipath transport protocol in a communication network, including use of a multipath transport throughput capability in order to improve throughout of a multipath transport connection that is based on a multipath transport protocol. The multipath transport throughput capability is configured to improve the throughput of the multipath transport connection by improving the delivery of acknowledgment packets from the data receiving side to the data transmitting side to acknowledge successful receipt of data packets sent from the data transmitting side to the data receiving side. The multipath transport throughput capability may be configured to improve the delivery of acknowledgment packets from the data receiving side to the data transmitting side by, for a given data packet that is successfully received at the data receiving side from the data transmitting side, sending multiple acknowledgment packets from the data receiving side to the data transmitting side where the multiple acknowledgment packets associated with the received data packet may be sent over multiple transport connections of the multipath transport connection. The use of multiple acknowledgment packets, sent over multiple transport connections of the multipath transport connection, to acknowledge delivery of a data packet sent over the multipath transport connection may be based on use of channel identifiers associated with the multiple transport connections of the multipath transport connection (e.g., a combination of a 5-tuple, sequence number, and channel identifier may be used to ensure that the correct data packet is being acknowledged, given that the acknowledgment packet that acknowledges the data packet may arrive at the data transmitting side via a channel that is different than the channel on which the data packet was transmitted). The use of multiple acknowledgment packets, sent over multiple transport connections of the multipath transport connection, to acknowledge delivery of a data packet sent over the multipath transport connection improves the probability that a successfully delivered data packet will be successfully acknowledged and the speed with which a successfully delivered data packet will be successfully acknowledged (even if the channel over which the data packet was delivered is experiencing problems) such that a next data packet of the multipath transport connection may be sent as soon as possible, thereby increasing the throughput of the multipath transport connection. It is noted that additional bandwidth that may be consumed in sending redundant acknowledgment packets is expected to be outpaced by the bandwidth savings due to reductions in retransmissions that result from increased reliability of acknowledgment delivery. It is noted that, although primarily presented herein with respect to embodiments in which improved throughput is enabled within the context of a particular type of multipath communication (namely, multipath communication that is based on the Multipath Transmission Control Protocol (MPTCP)), various embodiments presented herein may be adapted to support improved throughput within the context of various other types of multipath communication mechanisms (e.g., multipath communications based on other multipath protocols). It is noted that, although primarily presented herein with respect to embodiments in which improved throughput is supported within the context of a particular type of communication network (namely, a wireless network), various embodiments presented herein may be adapted to support improved throughput within the context of various other types of communication networks (e.g., a wireline network, a combination of wireless and wireline networks, or the like). It will be appreciated that these and various other embodiments and potential advantages of the multipath transport throughput capability may be further understood by way of reference to the example communication network of FIG. 1.

FIG. 1 depicts an example communication network configured to use a multipath transport throughput capability to improve throughout of a multipath connection that is based on a multipath transport protocol.

The communication network 100 includes a pair of data communication devices (DCDs) 110-S and 110-C (collectively, DCDs 110) and a set of communication networks (CNs) 120-1-120-N (collectively, CNs 120).

The DCDs 110 are configured to operate as endpoints of a multipath transport connection provided using a multipath transport protocol (which, within the context of FIG. 1, is MPTCP). The DCDs 110 support a data application (DA) 111 where, illustratively, an instance of the DA 111 (DA 111-S) is running on DCD 110-S and an instance of the DA 111 (DA 111-C) is running on DCD 110-C. The DCDs 110 exchange data packets between the DA 111-S running on DCD 110-S and the DA 111-C running on DCD 110-C using the multipath transport connection. The data packets may transport various types of data which may be exchanged between the DCDs 110 (e.g., text, audio, video, multimedia, or the like, as well as combinations thereof). The DCDs 110 may include any suitable devices which may operate as endpoints of a multipath transport connection, such as end user devices (e.g., a desktop computer, a laptop computer, a tablet computer, a smartphone, a set-top box, a smart television, or the like), machine-type communication (MTC) devices (e.g., machine-to-machine (M2M) communication devices, Internet-of-Things (IoT) devices, or the like), data-center communication devices (e.g., physical switches, virtual switches, virtual machines (VMs), or the like), network devices (e.g., such as where multipath transport is supported within a network, between networks, within the network portion of an end-to-end path, or the like), or the like, as well as various combinations thereof.

The DCDs 110 are configured to exchange data packets between the DA 111-S running on DCD 110-S and the DA 111-C running on DCD 110-C using an MPTCP connection. The DCDs 110 include MPTCP elements 112 configured to support transmission of data between the DAs 111 using MPTCP (illustratively, DCD 110-S includes an MPTCP element 112-S supporting communications of DA 111-S and DCD 110-C includes an MPTCP element 112-C supporting communications of DA 111-C). The MPTCP elements 112 are configured to support the MPTCP connection, with the MPTCP connection being established between the MPTCP elements 112. The MPTCP connection supported by MPTCP elements 112 is composed of a set of multiple TCP connections 119-1-119-N (collectively, TCP connections 119). The MPTCP elements 112 are configured to support communication via the MPTCP connection, for transporting data between the DA 111-S running on the DCD 110-S and the DA 111-C running on the DCD 110-C, using TCP connections 119 of the MPTCP connection. The MPTCP element 112-S of the DCD 110-S is configured to map data packets of the data flow of DA 111-C into one or more TCP connections 119 for transport to DCD 110-C and, similarly, the MPTCP element 112-C of the DCD 110-C is configured to receive data packets from DCD 110-S via one or more TCP connections 119 and map the data packets into a data flow for DA 111-C of DCD 110-C. The TCP connections 119 of the MPTCP connection may be configured to support the functionality of traditional TCP mechanisms. The MPTCP elements 112 may be configured to operate in various operational modes (e.g., a steering mode, a smearing mode, or the like) which, as discussed further below, may dictate whether multipath transport of data is applied at the per-flow level or at a higher level (e.g., per application, per device, or the like, as well as various combinations thereof). The TCP connections 119 of the MPTCP connection may traverse multiple communication paths available from the multiple CNs 120.

The CNs 120 may include communication networks configured to support communication between the DCDs 110 using the TCP connections 119 of the MPTCP connection. For example, the CNs 120 may include wireless networks (e.g., cellular wireless networks (e.g., Third Generation (3G) wireless networks such as Universal Mobile for Telecommunications System (UMTS) networks, Fourth Generation (4G) wireless networks such as Long Term Evolution (LTE) networks, Fifth Generation (5G) wireless networks, or the like, as well as various combinations thereof), WiFi networks, millimeter wave (mmW) networks, or the like, as well as various combinations thereof), wireline communication networks (e.g., Ethernet-based networks, optical networks, or the like, as well as various combinations thereof), or the like, as well as various combinations thereof. For example, where DCD 110-C and DCD 110-S are a dual-mode smartphone and an application server, respectively, the CNs 120 may include a cellular wireless network and a WiFi access network available to the DCD 110-C that provide two at least partially disjoint paths between DCD 110-C and DCD 110-S. For example, where DCD 110-C is a customer premises router and DCD 110-S is a network server, the CNs 120 may include multiple wireline networks such that there are two at least partially disjoint paths between DCD 110-C and DCD 110-S. For example, where DCD 110-C is wireless access node (e.g., an LTE Evolved Node B (eNodeB)) and DCD 110-S is a network element of a core wireless network (e.g., a Packet Data Network (PDN) gateway (PGW) of an LTE Evolved Packet Core (EPC) network), the CNs 120 may include portions of the wireless access network and portions of the wireless core network as well as a backhaul network therebetween where the backhaul network supports two at least partially disjoint paths between DCD 110-C and DCD 110-S. It is noted that MPTCP may be used within various other contexts and, thus, that the CNs 120 may include various other types, numbers, or arrangements of communication networks configured to support multipath communications between various combinations of devices. It will be appreciated that, although primarily presented with respect to use of multiple different CNs, 120 to support the TCP connections 119 of the MPTCP connection, the TCP connections 119 of the MPTCP connection may be supported using multiple different oaths (e.g., fully or partially disjoint paths) of a single communication network.

The MPTCP elements 112 are configured to support transmission of data packets via the MPTCP connection which, as noted above, includes multiple TCP connections 119 which may traverse multiple communication paths via multiple CNs 120. The type and location of the device in which an MPTCP element 112 is disposed may dictate the manner in which the MPTCP element 112 directs data packets of the MPTCP connection. In the case of a multimode wireless end device (e.g., a smartphone, a tablet computer, or the like), for example, the TCP connections 119 of the MPTCP connection may traverse different wireless access networks which may be accessed by the MPTCP element 112 via different wireless interfaces of the multimode wireless end device (e.g., a first TCP connection 119 of the MPTCP connection running over a cellular interface of the multi-mode wireless end device and a second TCP connection 119 of the MPTCP connection running over a WiFi interface of the multi-mode wireless end device). In other words, MPTCP may be used to aggregate multiple air interfaces to deliver peak downlink throughputs by using various capacities of existing air interfaces in operator networks. In the case of a network device (e.g., a router, a switch, or the like), for example, the TCP connections 119 of the MPTCP connection may traverse different backhaul networks or core networks which may be accessed by the MPTCP element 112 via different communication interfaces of the network device (e.g., a first TCP connection 119 of the MPTCP connection running over an Ethernet network and a second TCP connection 119 of the MPTCP connection running over an optical network). It will be appreciated that the interfaces and networks with which MPTCP elements 112 may interact for sending data over various TCP connections 119 of the MPTCP connection may vary for different types of devices, networks, or the like.

The MPTCP elements 112 are configured to support transmission of data packets via the MPTCP connection. The MPTCP elements 112 may be configured to support MPTCP scheduling functions and MPTCP congestion control functions. The MPTCP scheduling functions supported by the MPTCP elements 112 may include scheduling functions typically supported for MPTCP connections (e.g., assigning data packets of the MPTCP connection to TCP connections 119), retransmission of data packets of the MPTCP connection, or the like). The MPTCP congestion control functions supported by the MPTCP elements 112 may include any suitable congestion control mechanisms which may be used with the MPTCP connection (e.g., use of dynamic congestion control window sizes, use of the Linked-Increases Algorithm (LIA), use of the Opportunistic Linked-Increases Algorithm (OLIA), use of the Balanced Link Adaptation Algorithm (BALIA), or the like). The MPTCP elements 112 may be configured to support various other functions supporting transport of data packets via the MPTCP connection.

The MPTCP elements 112 are configured to support transmission of data packets via the MPTCP connection as discussed further below.

The MPTCP element 112-S of the DCD 110-S is configured to support transport of data packets of the DA 111 from DCD 110-S to DCD 110-C via the MPTCP connection. The MPTCP element 112-S controls transmission of the data packets of the MPTCP connection via the TCP connections 119 of the MPTCP connection. The MPTCP element 112-S of the DCD 110-S maintains a send packets queue 113-S and an unacknowledged packets queue 114-S. The MPTCP element 112-S receives data packets from the DA 111-S and stores the data packets in the send packets queue 113-S while the data packets are awaiting transmission by the MPTCP element 112-S via the MPTCP connection. The MPTCP element 112-S, when sending a data packet via the MPTCP connection, selects one of the TCP connections 119 via which the data packet is to be transmitted, removes the data packet from the send packets queue 113-S, transmits the data packet via the selected TCP connection 119, and adds the data packet to the unacknowledged packets queue 114-S. The unacknowledged packets queue 114-S represents data packets of the MPTCP connection which have been transmitted from DCD 110-S toward DCD 110-C, but for which the DCD 110-S has not yet received an acknowledgement from the DCD 110-C indicating that the data packet was successfully received by the DCD 110-C. The MPTCP element 112-S, upon receiving from the MPTCP element 112-C an acknowledgement indicating that a data packet transmitted by the MPTCP element 112-S via one of the TCP connections 119 was successfully received by the MPTCP element 112-C, removes that data packet from the unacknowledged packets queue 114-C.

The MPTCP element 112-C of the DCD 110-C is configured to support transport of data packets of the DA 111 from DCD 110-S to DCD 110-C via the MPTCP connection. The MPTCP element 112-C controls reception of the data packets of the MPTCP connection via the TCP connections 119 of the MPTCP connection. The MPTCP element 112-C of the DCD 110-C maintains a received packets queue 115-C. The MPTCP element 112-C receives data packets of the MPTCP connection via the TCP connections 119 of the MPTCP connection. The MPTCP element 112-C stores the received data packets in the received packets queue 115-C. The MPTCP element 112-C stores the received data packets in the received packets queue 115-C such that the data packets are in-order with respect to the MPTCP connection. The MPTCP element 112-C supports in-order delivery of data packets of the received packets queue 115-C to the DA 111-C. The MPTCP element 112-C continues to maintain out-of-order data packets in the received packets queue 115-C until the out-of-order data packets become in-order data packets. For example, where four data packets are transmitted from MPTCP element 112-S to MPTCP element 112-C via the MPTCP connection, but the third data packet is not successful received by the MPTCP element 112-C, the MPTCP element 112-C may provide the first and second packets from the received packets queue 115-C to the DA 111-C and may hold the fourth packets in the received packets queue 115-C pending receipt of the third packet (at which time MPTCP element 112-C may provide the third and fourth packets from the received packets queue 115-C to the DA 111-C in order). The MPTCP element 112-C, upon successfully receiving a data packet from the MPTCP element 112-S, acknowledges successful receipt of the data packet to the MPTCP element 112-S.

The MPTCP elements 112 of the DCDs 110, as noted above, may be configured to operate in various modes of operation, including a steering mode, a smearing mode, or the like. In the steering mode of operation, the data packets of a given flow are sent over one of the TCP connections 119 of the MPTCP connection. In the steering mode of operation, the MPTCP connection may be used to support multipath communications at a layer above the flow level (e.g., different data flows may be communicated over different ones of the TCP connections 119 of the MPTCP connection such that multipath communications are supported at the application layer (e.g., multiple flows of a given application (e.g., DA 111) are sent over multiple different TCP connections 119 of the MPTCP connection), at the device layer (e.g., multiple flows of multiple applications are sent over multiple different TCP connections 119 of the MPTCP connection), or the like, as well as various combinations thereof. In the smearing mode of operation, the data packets of a given flow are sent over multiple TCP connections 119 of the MPTCP connection (e.g., distributed across all of the TCP connections 119 of the MPTCP connection, distributed across a subset of the TCP connections 119 of the MPTCP connection, or the like).

The MPTCP elements 112 of the DCDs 110 are configured to support a multipath transport throughput capability in order to improve the throughput of the MPTCP connection. The multipath transport throughput capability is configured to improve the throughput of the MPTCP connection by improving the delivery of acknowledgment packets from MPTCP element 112-C of DCD 110-C to MPTCP element 112-S of DCD 110-S for data packets sent from MPTCP element 112-S of DCD 110-S to MPTCP element 112-C of DCD 110-C using the MPTCP connection. The MPTCP element 112-S of DCD 110-S selects a data packet for transmission via the MPTCP connection. The MPTCP element 112-S of DCD 110-S transmits the data packet via the MPTCP connection by transmitting the data packet over one of the TCP connections 119 of the MPTCP connection (for purposes of clarity, assume that the data packet is sent over the TCP connection 119-1 of the MPTCP connection). The MPTCP element 112-C of DCD 110-C receives the data packet over the TCP connection 119-1 and, rather than merely sending an associated acknowledgment packet to the MPTCP element 112-S of DCD 110-S via the TCP connection 119-1, sends multiple acknowledgment packets to the MPTCP element 112-S of DCD 110-S via multiple TCP connections 119 of the MPTCP connection. The multiple TCP connections 119 of the MPTCP connection via which the acknowledgment packets are sent may include all of the TCP connections 119 of the MPTCP connection or a subset of the TCP connections 119 of the MPTCP connection. The multiple TCP connections 119 of the MPTCP connection via which the acknowledgment packets are sent may include the TCP connection 119 via which the data packet was received (namely, TCP connection 119-1) and one or more other TCP connections 119 of the MPTCP connection. The MPTCP element 112-C of DCD 110-C may send the multiple acknowledgment packets by generating a single acknowledgement packet and replicating that acknowledgement packet to provide the multiple acknowledgement packets or by generating the multiple acknowledgement packets individually. The MPTCP element 112-S of DCD 110-S receives the multiple acknowledgement packets from MPTCP element 112-C of DCD 110-C via the multiple TCP connections 119 of the MPTCP connection (assuming that none are lost), accepts the first received acknowledgment packet as being an acknowledgment by the MPTCP element 112-C of DCD 110-C of successful receipt of the data packet, and discards any subsequently received acknowledgment packets. In this manner, the multipath transport throughput capability generally enables receipt of data packets to be acknowledged more quickly, since there may be situations in which acknowledgment packets may be delayed (e.g., due to congestion, poor channel conditions, or the like) or even lost in transit, and, thus, provides improvements in throughput of the TCP connections 119 and, therefore, also the MPTCP connection.

The MPTCP elements 112 of the DCDs 110 are configured to support the multipath transport throughput capability based on use of an identifier to enable unique mapping of the multiple acknowledgment packets received for a data packet to the data packet for which those multiple acknowledgment packets are sent. This identifier is primarily referred to herein as a channel identifier, which identifies the TCP connection 119 of the MPTCP connection on which the data packet was sent. The MPTCP elements 112 of the DCDs 110 may agree on the channel identifiers of the TCP connections 119 of the MPTCP connection in any suitable manner (e.g., negotiated in conjunction with establishment of the TCP connections 119 of the MPTCP connection, negotiated after establishment of the TCP connections 119 of the MPTCP connection, or the like). The MPTCP element 112-C of DCD 110-C, upon receiving a data packet from the MPTCP element 112-S of DCD 110-S (for purposes of clarity, again assume that the data packet is received over the TCP connection 119-1), generates the multiple acknowledgment packets and sends the multiple acknowledgment packets to the MPTCP element 112-S of DCD 110-S (assume that acknowledgment packets are sent over all of the TCP connections 119). The MPTCP element 112-C of DCD 110-C configures the acknowledgment packets by including information that may be used by the MPTCP element 112-S of DCD 110-S to determine the data packet being acknowledged. The MPTCP element 112-S of DCD 110-S, upon receiving one of the acknowledgment packets from the MPTCP element 112-C of DCD 110-C, determines the data packet that is being acknowledged based on the information included within the acknowledgment packet. The information of the acknowledgment packet that may be used (by MPTCP element 112-C of DCD 110-C) to indicate the data packet being acknowledged and that may be used (by MPTCP element 112-S of DCD 110-S) to identify the data packet being acknowledged may include a tuple that identifies the data flow with which the data packet is associated (e.g., a 5-tuple including source and destination Internet Protocol (IP) addresses, source and destination port information, and protocol information), a sequence number identifying the portion of the data flow transported by the data packet (where the sequence number may be unique to a particular TCP connection 119), and the channel identifier of the TCP connection 119-1 over which the data packet was sent. The channel identifier may be inserted into an unused header field of the acknowledgment packet or transported within the acknowledgment packet in other ways. It will be appreciated that the data packet being acknowledged may be indicated and identified in other ways (e.g., also or alternatively using other types of information which may be included within the acknowledgment packets).

Figure 2:
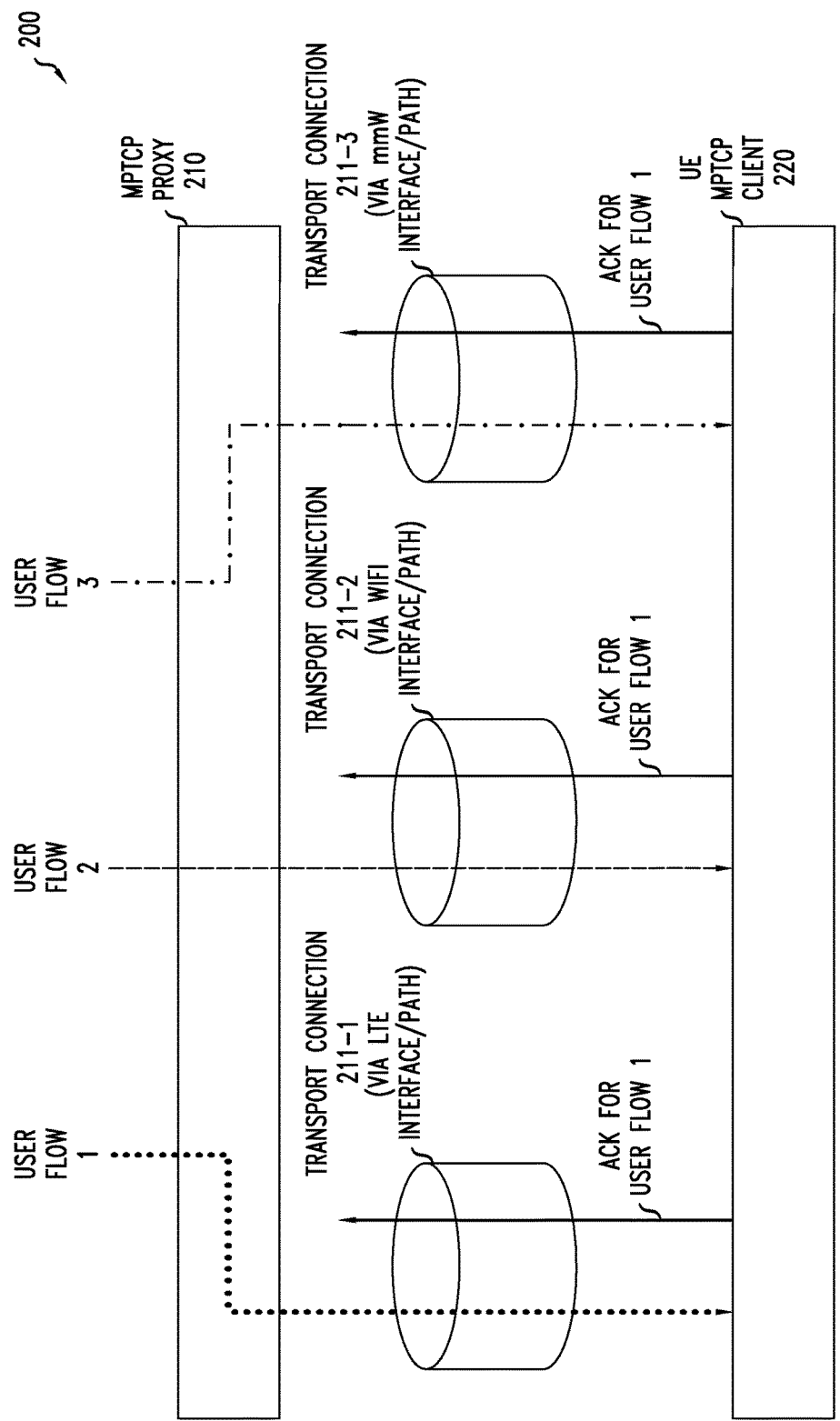
FIG. 2 depicts an example of use of multipath transport throughput capability to improve throughout of a multipath transport connection that is operating in a steering mode.
Figure 3:
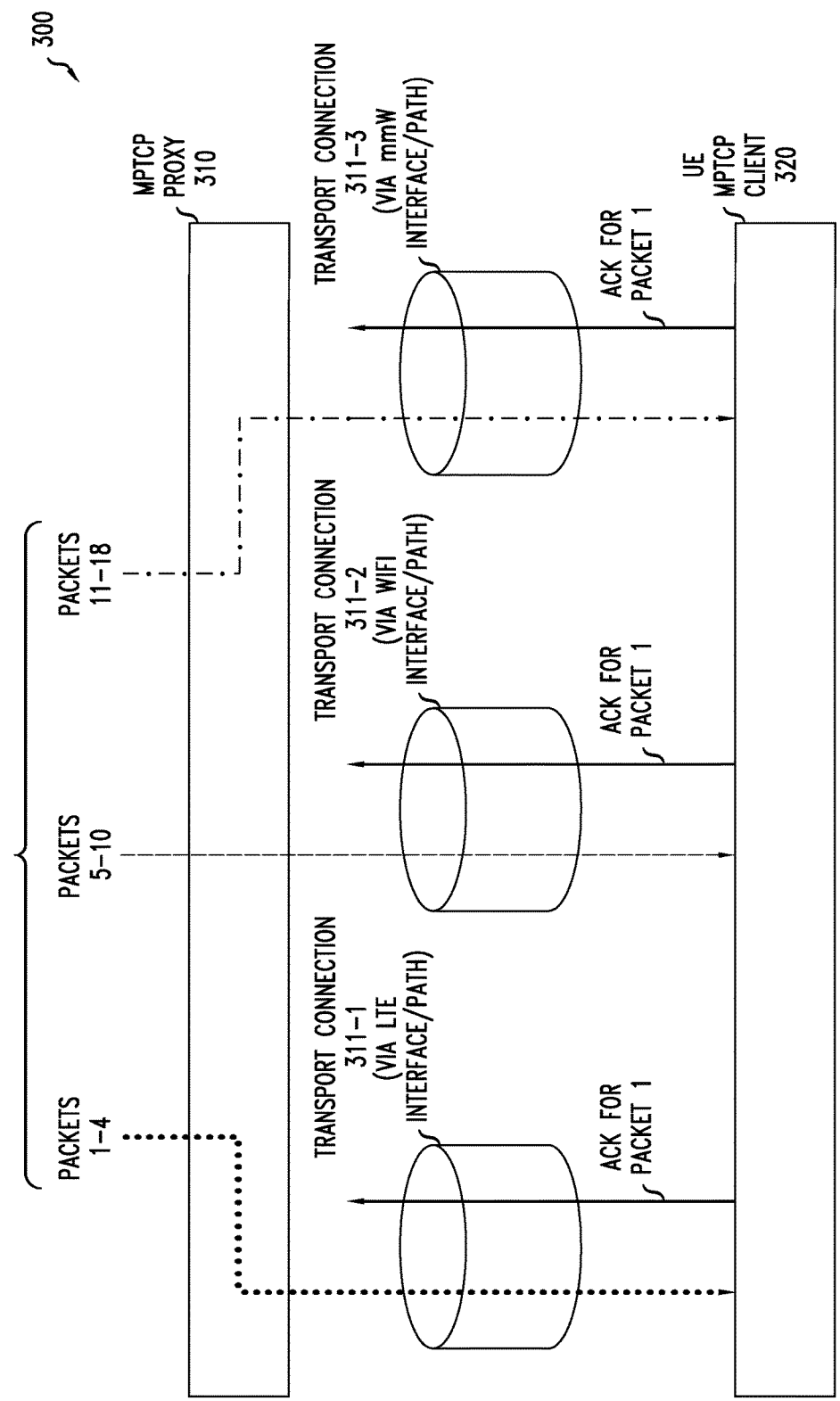
FIG. 3 depicts an example of use of multipath transport throughput capability to improve throughout of a multipath transport connection that is operating in a smearing mode.

The operation of the MPTCP elements 112 in supporting embodiments of the multipath transport throughput capability may be further understood by way of reference to FIG. 2 (which provides an example illustrating of use of embodiments of the multipath transport throughput capability in a steering mode of operation) and FIG. 3 (which provides an example illustrating of use of embodiments of the multipath transport throughput capability in a smearing mode of operation).

FIG. 2 depicts an example of use of multipath transport throughput capability to improve throughout of a multipath transport connection that is operating in a steering mode. The example 200 illustrates an MPTCP proxy 210 and a UE MPTCP client 220 supporting an MPTCP connection that includes three TCP connections 211 running over three communication paths associated with three different wireless access technologies (illustratively, a first TCP connection 211-1 running over an LTE interface/path, a second TCP connection 211-2 running over a WiFi interface/path, and a third TCP connection 211-3 running over a mmW interface/path). In the example 200, three user flows are supported between the MPTCP proxy 210 and the UE MPTCP client 220 (denoted as user flow 1, user flow 2, and user flow 3). In the steering mode of operation, the MPTCP layer of the MPTCP proxy 210 sends one user flow over one TCP connection and, thus, in this arrangement, over one air interface and one associated path. The MPTCP proxy 210, for each user flow, chooses the TCP connection 211 on which to send the user flow (e.g., based on a set of criteria) and sends all of the data packets of the user flow over the selected TCP connection. As such, in this example 200 of FIG. 2, there is a first user flow (user flow 1) being delivered via the first TCP connection 211-1 associated with the LTE interface/path, a second user flow (user flow 2) being delivered via the second TCP connection 211-2 associated with the WiFi interface/path, and a third user flow (user flow 3) being delivered via the third TCP connection 211-3 associated with the mmW interface/path. As illustrated in the example 200 of FIG. 2, for a given data packet of the first user flow that is successfully delivered from the MPTCP proxy 210 to the UE MPTCP client 220 over the first TCP connection 211-1 associated with the LTE interface/path, the UE MPTCP client 220 sends redundant acknowledgment packets over each of the three TCP connections 211 associated with the three wireless interfaces/path (even though different user flows are being delivered over the TCP connections 211-2 and 211-3 associated with the WiFi and mmW interfaces/paths, respectively). The MPTCP proxy 210, based on receipt of one of the acknowledgments packets, irrespective of whether received over the first TCP connection 211-1 via which the data packet was sent or via one of the other TCP connections 211 of the MPTCP connection (namely, second TCP connection 211-2 or third TCP connection 211-3), determines that the data packet was successfully received by the UE MPTCP client 220. The MPTCP proxy 210 discards the other acknowledgment packets since successful delivery of the data packet has already been confirmed. It is noted that the acknowledgment packets for the second and third user flows also may be sent over each of the three TCP connections 211 via the three wireless interfaces/paths, respectively, although this is omitted from FIG. 2 for purposes of clarity.

FIG. 3 depicts an example of use of multipath transport throughput capability to improve throughout of a multipath transport connection that is operating in a smearing mode. The example 300 illustrates an MPTCP proxy 310 and a UE MPTCP client 320 supporting an MPTCP connection that includes three TCP connections 311 running over three communication paths associated with three different wireless access technologies (illustratively, a first TCP connection 311-1 running over an LTE interface/path, a second TCP connection 311-2 running over a WiFi interface/path, and a third TCP connection 311-3 running over a mmW interface/path). In the example 300, a single user flow (denoted as user flow 1) is supported between the MPTCP proxy 310 and the UE MPTCP client 320. In the smearing mode of operation, the MPTCP layer of the MPTCP proxy 310 splits packets of the single user flow across the TCP connections 311 and, thus, in this arrangement, across the air interfaces/paths. The MPTCP proxy 310, for each packet of the user flow, chooses the TCP connection 311 on which to send the packet (e.g., based on a set of criteria) and sends the data packets of the user flow over the TCP connections 311 selected for the data packets. As such, in this example 300 of FIG. 3, a first set of packets of the user flow (illustratively, packets 1-4 of the user flow) are sent via the first TCP connection 311-1 associated with the LTE interface/path, a second set of packets of the user flow (illustratively, packets 5-10 of the user flow) are sent via the second TCP connection 311-2 associated with the WiFi interface/path, and a third set of packets of the user flow (illustratively, packets 11-18 of the user flow) are sent via the third TCP connection 311-3 associated with the mmW interface/path. As illustrated in the example 300 of FIG. 3, for a given data packet of the user flow that is successfully delivered from the MPTCP proxy 310 to the UE MPTCP client 320 over the first TCP connection 311-1 associated with the LTE interface/path, the UE MPTCP client 320 sends redundant acknowledgment packets over each of the three TCP connections 311 associated with the three wireless interfaces/paths (even though other sets of packets of the user flow are being delivered over the TCP connections 311-2 and 311-3 associated with the WiFi and mmW interfaces/paths, respectively). The MPTCP proxy 310, based on receipt of one of the acknowledgments packets, irrespective of whether received over the first TCP connection 311-1 via which the data packet was sent or via one of the other TCP connections 311 of the MPTCP connection (namely, second TCP connection 311-2 or third TCP connection 311-3), determines that the data packet was successfully received by the UE MPTCP client 320. The MPTCP proxy 310 discards the other acknowledgment packets since successful delivery of the data packet has already been confirmed. It is noted that the acknowledgment packets for the second and third sets of packets of the user flow also may be sent over each of the three TCP connections 311 via the wireless interfaces/paths, respectively, although this is omitted from FIG. 3 for purposes of clarity.

Figure 4:
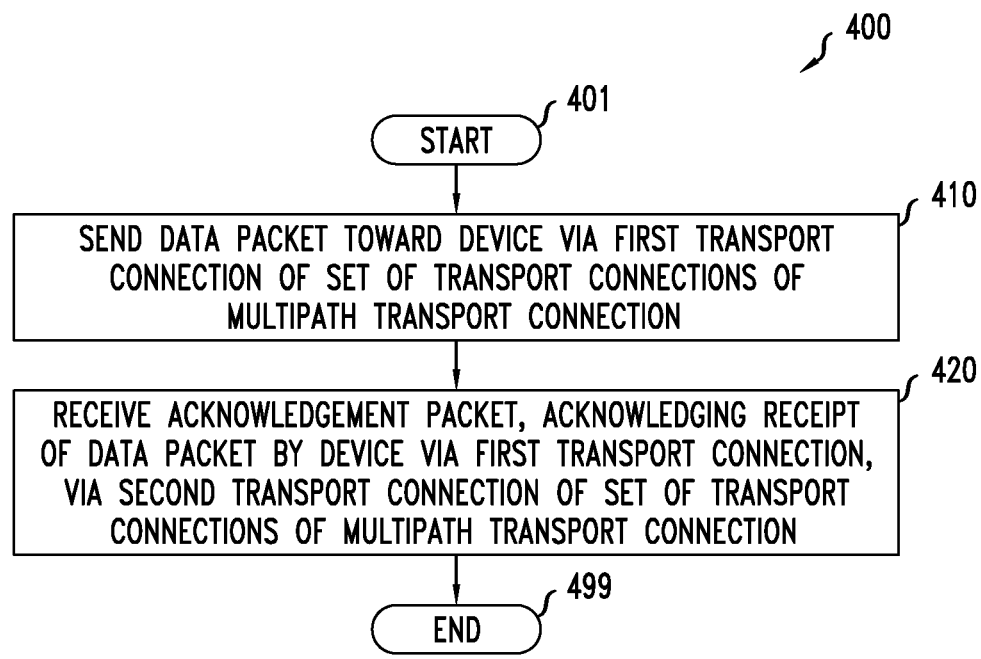
FIG. 4 depicts an embodiment of a method for use by a data transmitting device to handle acknowledgment of a data packet based on the multipath transport throughput capability.

FIG. 4 depicts an embodiment of a method for use by a data transmitting device to handle acknowledgment of a data packet based on the multipath transport throughput capability. The data packet is communicated via a multipath transport connection including a set of transport connections. It will be appreciated that the functions of method 400, although presented in FIG. 4 as being performed serially, may be performed contemporaneously or in a different order than as presented in FIG. 4. At block 401, method 400 begins. At block 410, a data packet is sent toward a device via a first transport connection of the set of transport connections of the multipath transport connection. At block 420, an acknowledgment packet, acknowledging receipt of the data packet by the device via the first transport connection, is received via a second transport connection of the set of transport connections. At block 499, method 400 ends. It will be appreciated that method 400 of FIG. 4 may be adapted to perform various other functions presented herein as being supported by a data transmitting device to handle acknowledgment of a data packet based on the multipath transport throughput capability (e.g., monitoring multiple transport connections of the set of transport connections for an acknowledgment associated with the data packet, discarding subsequently received acknowledgment packets that are acknowledging receipt of the data packet by the device, or the like, as well as various combinations thereof).

Figure 5:
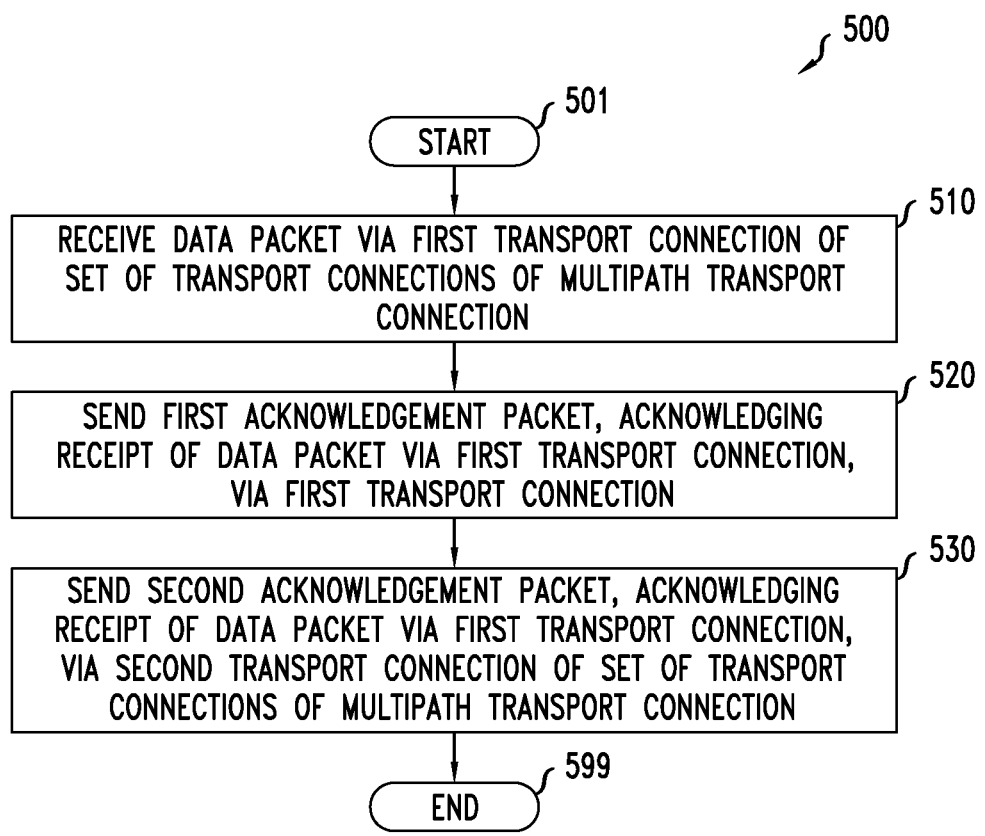
FIG. 5 depicts an embodiment of a method for use by a data receiving device to handle acknowledgment of a data packet based on the multipath transport throughput capability.

FIG. 5 depicts an embodiment of a method for use by a data receiving device to handle acknowledgment of a data packet based on the multipath transport throughput capability. The data packet is communicated via a multipath transport connection including a set of transport connections. It will be appreciated that the functions of method 500, although presented in FIG. 5 as being performed serially, may be performed contemporaneously or in a different order than as presented in FIG. 5. At block 501, method 500 begins. At block 510, a data packet is received via a first transport connection of the set of transport connections. At block 520, a first acknowledgment packet acknowledging receipt of the data packet via the first transport connection is sent via the first transport connection. At block 530, a second acknowledgment packet acknowledging receipt of the data packet via the first transport connection is sent via a second transport connection of the set of transport connections. At block 599, method 500 ends. It will be appreciated that method 500 of FIG. 5 may be adapted to perform various other functions presented herein as being supported by a data receiving device to handle acknowledgment of a data packet based on the multipath transport throughput capability (e.g., sending additional acknowledgment packets for the data packet via other transport connections of the set of transport connections or the like).

It will be appreciated that various embodiments of the multipath transport throughput capability may provide various advantages or potential advantages. For example, various embodiment of the multipath transport throughput capability may be particularly useful within the context of wireless networks in which wireless end devices have multiple wireless interfaces (e.g., multimode wireless end devices supporting cellular and WiFi interfaces) available for downlink and uplink communications. Various embodiment of the multipath transport throughput capability may significantly enhance TCP throughput by leveraging the multiple air interfaces to deliver uplink acknowledgments with higher reliability in less time and, thus, provide higher downlink throughput. The use of multiple air interfaces to deliver uplink acknowledgments enables improved delivery of uplink acknowledgments, especially where the wireless channel via which the associated data packet that is being acknowledged degrades between the time when the data packet is delivered in the downlink direction and the time when the acknowledgment packet is sent in the uplink direction. In this scenario, and other scenarios which might otherwise negatively impact delivery of acknowledgements, use of other wireless links to transport the acknowledgments toward the source will permit the source to continue to send data packets in the downlink direction, thereby maintaining high downlink throughput rates. It is noted that the use of multipath transport throughput capability within this context may be particularly useful given that TCP connections are often used to transport data for various bandwidth-intensive applications (e.g., File Transfer Protocol (FTP), Hypertext Transfer Protocol (HTTP) Adaptive Streaming (HAS) for video flows, or the like) over the downlink. It will be appreciated that various embodiments of the multipath transport throughput capability may provide various other advantages or potential advantages.

Figure 6:
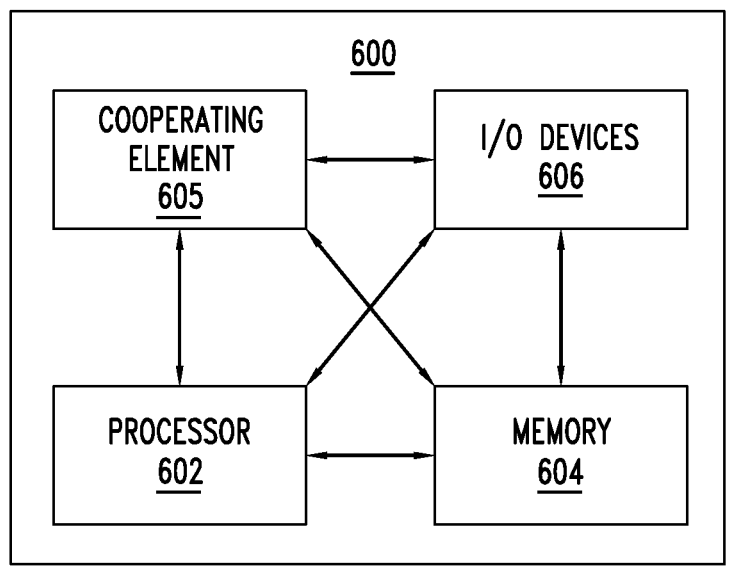
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit (CPU), a processor having a set of processor cores, a processor core of a processor, or the like) and a memory 604 (e.g., a random access memory (RAM), a read only memory (ROM), or the like). The processor 602 and the memory 604 are communicatively connected.

The computer 600 also may include a cooperating element 605. The cooperating element 605 may be a hardware device. The cooperating element 605 may be a process that can be loaded into the memory 604 and executed by the processor 602 to implement functions as discussed herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 of FIG. 6 may represent a general architecture and functionality suitable for implementing functional elements described herein, portions of functional elements described herein, or the like, as well as various combinations thereof. For example, computer 600 may provide a general architecture and functionality that is suitable for implementing one or more of a DCD 110 or a portion of an DCD 110, an element of a CN 120, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
 a processor and a memory communicatively connected to the processor, the processor configured to cause the apparatus to at least:
  receive a data packet via a first transport layer connection of a set of transport layer connections of a multipath transport layer connection, wherein the transport layer connections are associated with a transport layer protocol;
  send, via the first transport layer connection, a first acknowledgment packet acknowledging receipt of the data packet via the first transport layer connection; and
  send, via a second transport layer connection of the set of transport layer connections, a second acknowledgment packet acknowledging receipt of the data packet via the first transport layer connection.

2. The apparatus of claim 1, wherein the first acknowledgment packet and the second acknowledgment packet each include an identifier associated with the first transport layer connection.

3. The apparatus of claim 2, wherein the identifier associated with the first transport layer connection is included in an unused header field of the first acknowledgment packet and is included in an unused header field of the second acknowledgment packet.

4. The apparatus of claim 1, wherein the first transport layer connection is associated with a first communication interface of the apparatus and the second transport layer connection is associated with a second communication interface of the apparatus.

5. The apparatus of claim 4, wherein the first communication interface comprises a cellular communication interface, wherein the second communication interface comprises a WiFi communication interface or a millimeter wave (mmW) interface.

6. The apparatus of claim 1, wherein the first transport layer connection is associated with a first communication network and the second transport layer connection is associated with a second communication network.

7. The apparatus of claim 6, wherein the first communication network comprises a cellular communication network, wherein the second communication network comprises a WiFi communication network or a millimeter wave (mmW) network.

8. The apparatus of claim 1, wherein the processor is configured to cause the apparatus to at least:
 extract the data packet from the multipath transport layer connection; and
 provide the data packet toward an application layer of the apparatus.

9. The apparatus of claim 1, wherein the multipath transport layer connection comprises a Multipath Transmission Control Protocol (MPTCP) connection, wherein the transport layer connections comprise TCP connections.

10. A method, comprising:
 receiving a data packet via a first transport layer connection of a set of transport layer connections of a multipath transport layer connection, wherein the transport layer connections are associated with a transport layer protocol;
 sending, via the first transport layer connection, a first acknowledgment packet acknowledging receipt of the data packet via the first transport layer connection; and
 sending, via a second transport layer connection of the set of transport layer connections, a second acknowledgment packet acknowledging receipt of the data packet via the first transport layer connection.

11. An apparatus, comprising:
 a processor and a memory communicatively connected to the processor, the processor configured to cause the apparatus to at least:
  send a data packet toward a device via a first transport layer connection of a set of transport layer connections of a multipath transport layer connection, wherein the transport layer connections are associated with a transport layer protocol;
  receive, via a second transport layer connection of the set of transport layer connections, an acknowledgment packet acknowledging receipt of the data packet by the device via the first transport layer connection;
  receive, via the first transport layer connection, a second acknowledgment packet acknowledging receipt of the data packet by the device via the first transport layer connection; and
  discard the second acknowledgment packet based on a determination that the receipt of the data packet by the device via the first transport layer connection was previously acknowledged.

12. The apparatus of claim 11, wherein the acknowledgment packet includes an identifier associated with the first transport layer connection.

13. The apparatus of claim 12, wherein the processor is configured to cause the apparatus to at least:
 determine, based on the identifier associated with the first transport layer connection, a tuple of a header of the acknowledgment packet, and a sequence number of the acknowledgment packet, that the data packet was successfully received by the device via the first transport layer connection.

14. The apparatus of claim 11, wherein the first transport layer connection is associated with a first communication network and the second transport layer connection is associated with a second communication network.

15. The apparatus of claim 14, wherein the first communication network comprises a cellular communication network, wherein the second communication network comprises a WiFi communication network or a millimeter wave (mmW) network.

16. The apparatus of claim 11, wherein the first transport layer connection is associated with a first communication interface of the apparatus and the second transport layer connection is associated with a second communication interface of the apparatus.

17. The apparatus of claim 16, wherein the first communication interface comprises a cellular communication interface, wherein the second communication interface comprises a WiFi communication interface or a millimeter wave (mmW) interface.

18. The apparatus of claim 11, wherein the multipath transport layer connection comprises a Multipath Transmission Control Protocol (MPTCP) connection, wherein the transport layer connections comprise TCP connections.

19. A method, comprising:
sending a data packet toward a device via a first layer transport connection of a set of transport layer connections of a multipath transport layer connection, wherein the transport layer connections are associated with a transport layer protocol;
receiving, via a second transport connection of the set of transport layer connections, an acknowledgment packet acknowledging receipt of the data packet by the device via the first transport layer connections;
receiving, via the first transport layer connection, a second acknowledgment packet acknowledging receipt of the data packet by the device via the first transport layer connection; and
discarding the second acknowledgment packet based on a determination that the receipt of the data packet by the device via the first transport layer connection was previously acknowledged.

* * * * *